(12) United States Patent
Rammah et al.

(10) Patent No.: US 9,596,397 B2
(45) Date of Patent: Mar. 14, 2017

(54) DUAL SHOT STROBE LENS AND FLEX AND STIFFENER FEATURES OF A CAMERA

(71) Applicant: Apple Inc., Cupertino, CA (US)

(72) Inventors: Marwan Rammah, Cupertino, CA (US); Ashutosh Y. Shukla, Santa Clara, CA (US); David A. Pakula, San Francisco, CA (US); Jared M. Kole, San Francisco, CA (US); Eric N. Nyland, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/609,404

(22) Filed: Jan. 29, 2015

(65) Prior Publication Data

US 2016/0072996 A1 Mar. 10, 2016

Related U.S. Application Data

(63) Continuation of application No. PCT/US2015/013557, filed on Jan. 29, 2015.
(Continued)

(51) Int. Cl.
*H04N 5/225* (2006.01)
*G02B 7/02* (2006.01)
(Continued)

(52) U.S. Cl.
CPC ............ *H04N 5/2257* (2013.01); *G02B 3/08* (2013.01); *G02B 7/003* (2013.01); *G02B 7/02* (2013.01);
(Continued)

(58) Field of Classification Search
None
See application file for complete search history.

(56) References Cited

U.S. PATENT DOCUMENTS

| 2003/0180037 A1* | 9/2003 | Sommers | G03B 15/05 396/155 |
| 2006/0216023 A1* | 9/2006 | Tokiwa | G03B 17/02 396/532 |

(Continued)

FOREIGN PATENT DOCUMENTS

| KR | 20100091564 | 8/2010 |
| KR | 20120082655 | 7/2012 |
| KR | 20130053178 | 5/2013 |

OTHER PUBLICATIONS

PCT Application No. PCT/US2015/013557—International Search Report and Written Opinion dated May 28, 2015.

*Primary Examiner* — Roberto Velez
*Assistant Examiner* — Yih-Sien Kao
(74) *Attorney, Agent, or Firm* — Zachary D. Hadd

(57) ABSTRACT

An electronic device having a lens and a lens retaining member is disclosed. The lens and the lens retaining member may both be molded in a single mold cavity. However, the lens includes a first material that is clear and translucent, while the lens retaining member includes a second material that is opaque. The lens retaining member may include an alignment such that the lens and lens retaining member, when secured to a flexible circuit, may self-align with a window. The window allows a light source to emit light while the lens retaining member blocks or reflects light. In another embodiment, a container having a first member and a second member may be positioned around a camera module. The container may act as an EMI shield for the camera module.

20 Claims, 12 Drawing Sheets

Related U.S. Application Data

(60) Provisional application No. 62/046,796, filed on Sep. 5, 2014.

(51) Int. Cl.
    *G02B 7/00*     (2006.01)
    *G02B 3/08*     (2006.01)
    *G03B 15/05*     (2006.01)
    *G06F 1/16*     (2006.01)

(52) U.S. Cl.
    CPC ........... *G03B 15/05* (2013.01); *G06F 1/1626* (2013.01); *H04N 5/2256* (2013.01); *G03B 2215/0567* (2013.01); *G03B 2215/0571* (2013.01); *G03B 2215/0592* (2013.01); *G03B 2217/002* (2013.01)

(56) References Cited

U.S. PATENT DOCUMENTS

| | | | |
|---|---|---|---|
| 2008/0055747 A1* | 3/2008 | Zhang | B29C 45/16 359/819 |
| 2011/0001862 A1* | 1/2011 | Chang | G02B 7/04 348/308 |
| 2011/0026144 A1* | 2/2011 | Shyu | B29C 43/18 359/819 |
| 2012/0182710 A1 | 7/2012 | Lee et al. | |
| 2014/0160324 A1 | 6/2014 | Kim | |
| 2015/0335114 A1* | 11/2015 | Stammbach | A45C 11/00 224/191 |
| 2016/0133771 A1* | 5/2016 | Pelletier | H01L 31/0543 136/259 |

* cited by examiner

DUAL SHOT STROBE LENS AND FLEX AND STIFFENER FEATURES OF A CAMERA

CROSS-REFERENCE TO RELATED APPLICATION(S)

This is a continuation of International Application PCT/US15/13557, with an international filing date of Jan. 29, 2015, entitled "Camera Features of an Electronic Device Including Dual Shot Strobe Lens and Flex and Stiffener Features," which claims the benefit of priority under 35 U.S.C §119(e) to U.S. Provisional Application No. 62/046,796, filed on Sep. 5, 2014, the disclosure of which is incorporated herein by reference in its entirety.

FIELD

The described embodiments relate generally to electronic devices having cameras. In particular, the present embodiments relate to features for controlling light emission from a light source module in the electronic device, and for shielding a camera module in the electronic device from electromagnetic interference.

BACKGROUND

Electronic devices often include a camera module used to capture images. In order to enhance the image, a light source module (e.g., LED) positioned within an electronic device may be used as a flash thereby providing additional light. The light source is generally a bright light emitted from the electronic device. However, rather than the bright light completely exiting the electronic device, some light may extend into other areas of the electronic device. This may include, for example, a display panel that displays visual content, or an opening between assembled parts. Either case results in light in unwanted locations of the electronic device.

Also, the camera module (or a second camera module in a different location of the electronic device) may be used to capture images from a different vantage point. The camera may be positioned proximate to other internal components which emit electromagnetic radiation, such as an antenna or an electronic sensor. The electromagnetic radiation may interfere with the camera's performance. Conversely, the camera may emit its own electromagnetic radiation which interferes with the performance of the antenna or the electronic sensor.

SUMMARY

In one aspect, an electronic device is described. The electronic device may include a window formed from a transparent material. In some cases, the window is adhesively secured to an opening in an enclosure of the electronic device. The electronic device may further include a lens molded from a first material and positioned on the window. The electronic device may further include a lens retaining member molded from a second material different from the first material. In some cases, the lens retaining member includes a protrusion. The electronic device may further include an alignment member proximate to the lens retaining member. In some embodiments, the lens retaining member is aligned with respect to the window via the alignment member.

In another aspect, a method for assembling an electronic device is described. The method may include molding a lens from a first material. The method may further include molding a lens retaining member. In some cases, the lens retaining member is molded from a second material different from the first material. The method may further include securing an alignment member to the lens retaining member. In some embodiments, the lens retaining member is aligned with respect to a window via the alignment member. Also, in some embodiments, the alignment member is free of contact with the enclosure. The method may further include securing a light source to the lens retaining member via a circuit electrically connected to the light source. In some embodiments, molding the lens and the lens retaining member may include filling the first material and the second material in a single mold cavity.

In another aspect, an electronic device having a camera module is described. The electronic device may include a container that includes a first containment member and a second containment member. In some cases, the first containment member and the second containment member combine to form an electromagnetic interference (EMI) shield for the camera module. The first containment member and the second containment member, therefore, shield the camera module from EMI. The electronic device may further include a first adhesive layer that adhesively secures the first containment member to a circuit that is electrically connected to the camera module. The electronic device may further include a second adhesive layer positioned between the first containment member and the second containment member to adhesively secure the first containment member to the second containment member. In some embodiments, the first adhesive layer and the second adhesive layer are conductive adhesives.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
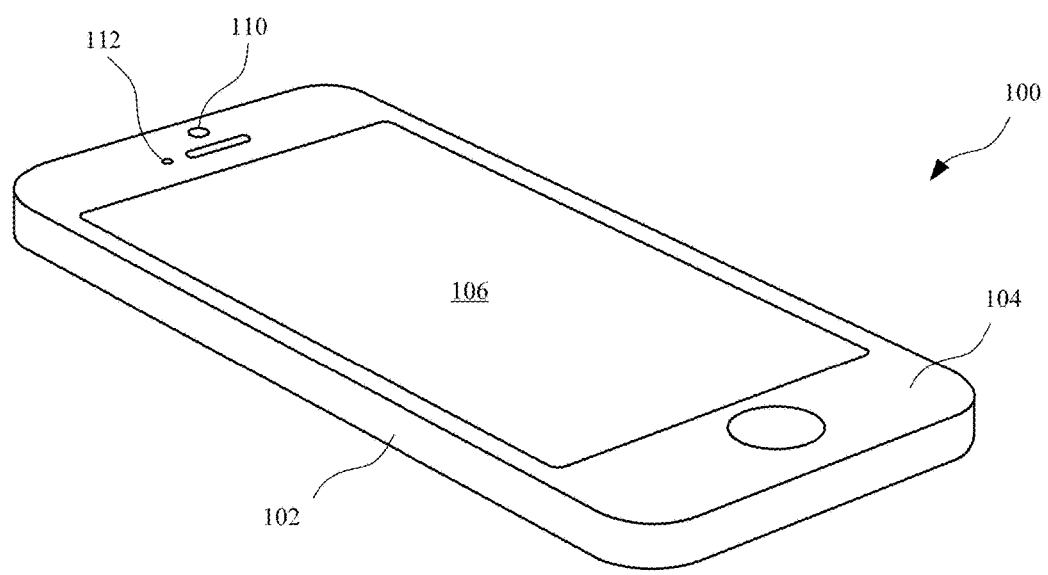
FIG. 1 illustrates an embodiment of electronic device.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to a light source module in an electronic device. The light source module may be formed by a "dual shot" process in which a single mold cavity is used to mold both a lens and a lens retaining member. The lens may be formed by adding to the single mold cavity a first material that is generally clear and translucent. Then, the lens retaining member portion is formed by adding a second material different from the first material to the single mold cavity. The second material is generally formed from an opaque material. In this manner, some light emitted from a light source module positioned between the lens retaining member extends through the lens and other light is absorbed or reflected by the light retaining member. Also, this ensures a desired relationship and functionality between the lens and the lens retaining member, that is, the lens retaining member closely conforms to the outer dimensions of the lens, and absorbs or reflects light emitted from the light source module with minimal light lost to other locations of the electronic device.

Also, in some embodiments, the electronic device may include a camera module positioned proximate to an opening of a ceramic substrate. In a load-bearing event (e.g., dropping the electronic device), the ceramic substrate may be prone to cracking. To relieve stress on the ceramic substrate, the camera may be electrically connected to a flexible circuit via a conductive adhesive. The phrase "conductive adhesive" as used throughout this detailed description and in the claims refers to an adhesive that is capable of conducting electrical current. This assembly allows for relief on the ceramic substrate. Also, in order provide additional stiffness and rigidity, a metal container may be positioned below the camera. The metal container is also configured to shield the camera from electromagnetic radiation emitted from internal components within the electronic device. Also, the metal container may be a unitary structure or may be a two-piece structure. In the latter configuration, the metal container may conform more closely to the camera module. In this manner, the camera module is further shielded from electromagnetic radiation and fewer manufacturing steps and material are required. Also, the other internal components may be shielded by radiation emitted from the camera module during use.

These and other embodiments are discussed below with reference to FIGS. 1-15. However, those skilled in the art will readily appreciate that the detailed description given herein with respect to these Figures is for explanatory purposes only and should not be construed as limiting.

FIG. 1 illustrates an embodiment of electronic device 100, or simply device 100. In some embodiments, device 100 is a mobile telecommunications device, such as an iPhone® from Apple, Inc., of Cupertino, Calif. In some embodiments, device 100 is a tablet computing device, such as an iPad® from Apple, Inc., of Cupertino, Calif. Device 100 may include enclosure 102 that receives cover glass 104. In some embodiments, enclosure 102 is formed from a metal material, such as aluminum or aluminum alloy. Also, display panel 106 may be positioned between cover glass 104 and enclosure 102. Display panel 106 may be configured to transmit visual display content that may be viewed by a user.

Device 100 may further include substrate 108 surrounding display panel 106. In some embodiments, substrate 108 is made from a ceramic material. Also, device 100 may include a camera module (not shown) configured to capture an image through first opening 110 of substrate 108. The camera module may be referred to as a "front facing camera." Also, the camera module may be controlled by a user input through a touch sensor (not shown) electrically coupled to display panel 106. Device 100 may also include a sensor positioned proximate to second opening 112 of substrate 108. The sensor may detect objects within a predetermined proximity of device 100 and generate a signal used to place display panel 106 in an "off" or "sleep" mode.

Figure 2:
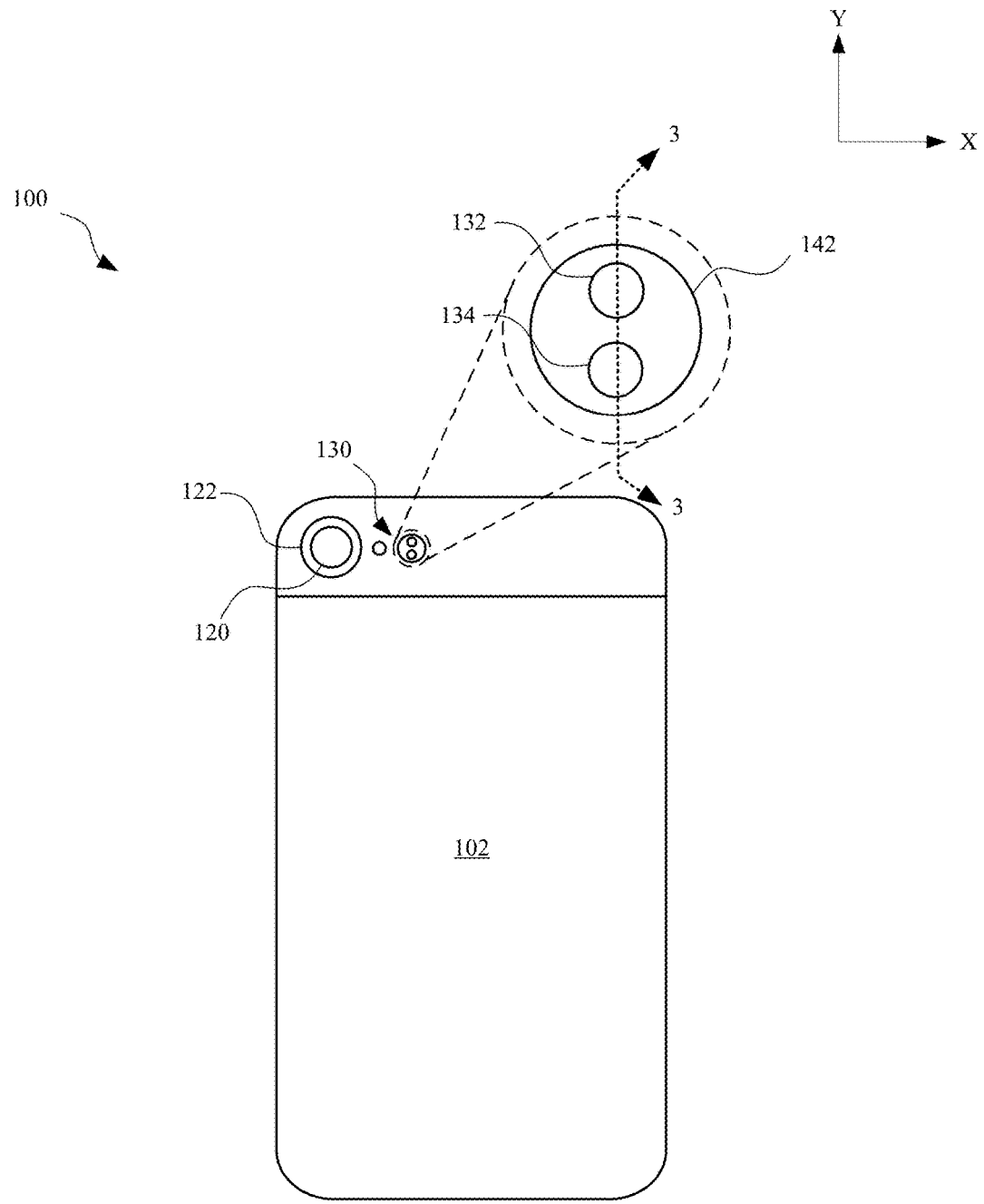
FIG. 2 illustrates a plan view showing a rear portion of the electronic device shown in FIG. 1, showing the device having a second camera module and a lens module configured to capture images through an opening.

FIG. 2 illustrates a plan view showing a rear portion of device 100 showing device 100 having second camera module 120 configured to capture images through opening 122 of enclosure 102, or alternatively, opening 122 of a ceramic substrate. In order to improve image capturing of second camera module 120, device 100 may further include lens module 130 configured to allow light through enclosure 102 via opening 122. In some embodiments, lens module 130 includes a transparent material that allows light to pass and an opaque member configured to block or absorb light. In the enlarged view shown in FIG. 2, device 100 includes first light source 132 and second light source 134 that may be used to define a flash event used in conjunction with camera module 120 when camera module 120 captures an image. In some embodiments, first light source 132 and second light source 134 are light-emitting diodes ("LEDs"). First light source 132 and second light source 134 combine to provide light, for example, to enhance the image capture abilities of second camera module 120. Also, the enlarged view shows first light source 132 and second light source 134 positioned behind window 142. In other embodiments, a single light source may be used.

Figure 3:
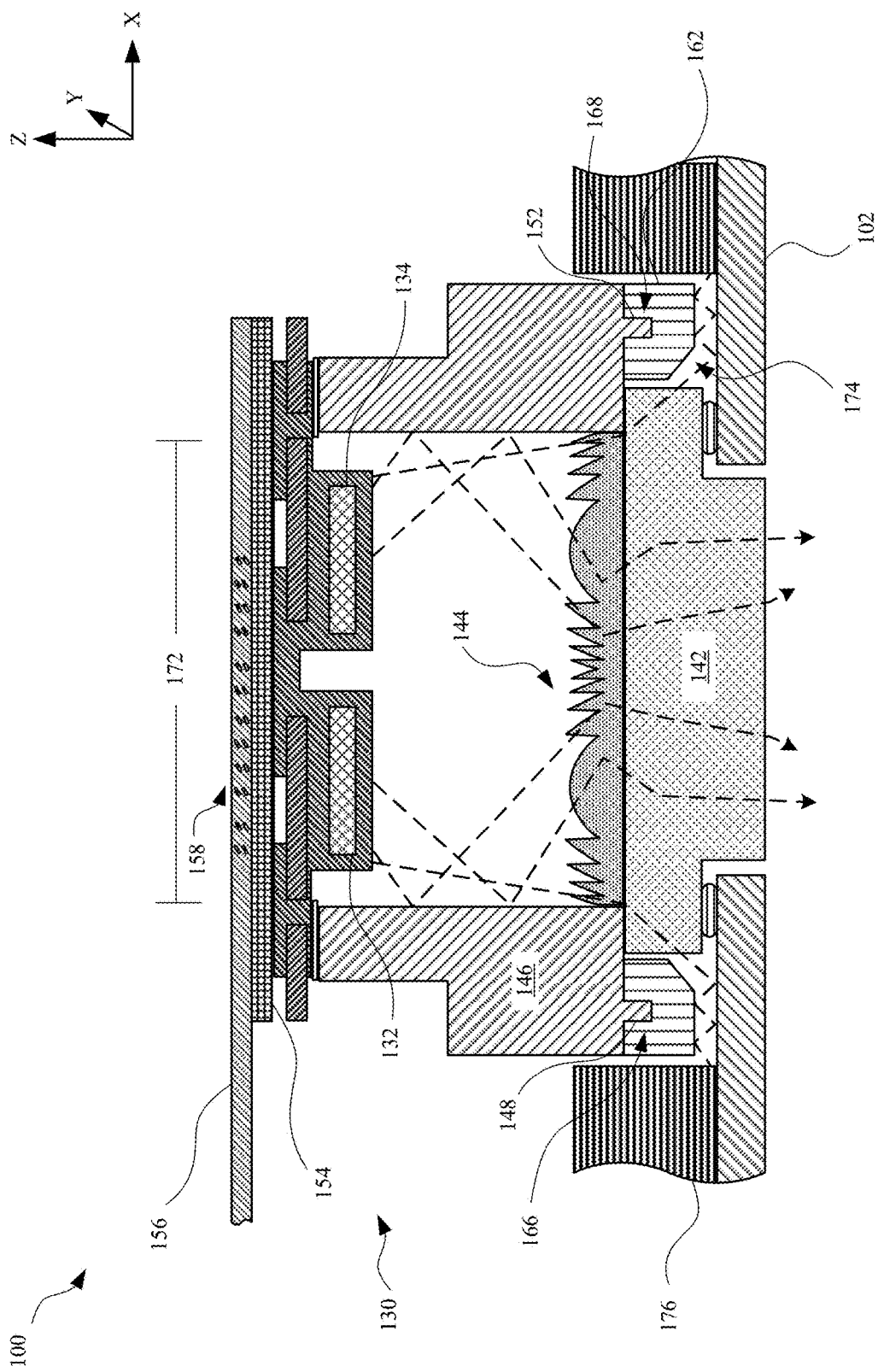
FIG. 3 illustrates a cross sectional view of the embodiment of the light source module taken along the 3-3 line in FIG. 2, showing various features used in conjunction with the light source module.

FIG. 3 illustrates a cross sectional view of device 100 shown in FIG. 2, taken along the 3-3 line showing various features used in conjunction with lens module 130. For example, lens module 130 may include lens 144 configured to direct light emitted from first light source 132 and/or second light source 134 through window 142 adhesively secured to enclosure 102. Lens module 130 may further include lens retaining member 146. In some embodiments, lens 144 is generally flat. In other embodiments, lens 144 is a concave lens. Still, in other embodiments, lens 144 is a convex lens. In the embodiments shown in FIG. 3, lens 144 is a Fresnel lens. Also, in some embodiments, lens 144 is made from glass. In the embodiment shown in FIG. 3, lens 144 is formed from plastic, which may include a clear polycarbonate plastic that allows light emitted from first light source 132 and second light source 134 to pass.

In some embodiments, lens 144 may be molded prior to assembly, or alternatively, lens 144 may be molded using a mold cavity (not shown). Molding may be performed by techniques such as injection molding or printing lens 144 via a three-dimensional printer. Subsequent to molding lens 144, lens retaining member 146 may be molded with lens 144. For example, the mold cavity used to form lens 144 includes additional space to receive a liquid polymeric material to form lens retaining member 146. In this manner, lens retaining member 146 conforms to the outer dimensions of lens 144. For example, in cases where lens 144 is generally circular or round having outer diameter 172, lens retaining member 146 has an inner diameter substantially similar to outer diameter 172. Lens retaining member 146 may be made from a material or materials having colors such as gray, black, or white, any of which may be selected in order enhance the ability to block light from exiting via lens retaining member 146. Moreover, the color of lens retaining member 146 may be selected based on the color of the surrounding ceramic substrate in order to enhance the appearance of device 100. Also, lens retaining member 146 may be formed from any molding technique previously described for molding lens 144.

FIG. 3 further shows first light source 132 and second light source 134 coupled to circuit 154. In some embodiments, circuit 154 is a printed circuit board ("PCB"). Further, first light source 132, second light source 134, and circuit 154 may be secured to flexible circuit 156 that is connected to another internal component, such as a main logic board (not shown). Flexible circuit 156 may be configured to flex or bend by a force or forces acting on flexible circuit 156. It should be noted that the aforementioned components are electrically connected to each other. For example, an electrical signal may be transmitted from the main logic board to first light source 132 and/or second light source 134 via circuit 154 and flexible circuit 156. Also, in some embodiments, flexible circuit 156 includes metal trace 158. Metal trace 158 may be formed from metal such as a copper material. Metal trace 158 is designed to enhance the electrically conductive capabilities of flexible circuit 156.

In some embodiments, lens retaining member 146 is secured to circuit 154. In this manner, first light source 132 and second light source 134 may be positioned above window 142 in the z-direction (as shown in FIG. 3) by adjusting flexible circuit 156. To improve alignment of components, and in particular to align lens retaining member 146 with respect to window 142, alignment member 162 may be used. Alignment member 162 may extend in a circular manner similar to that of lens retaining member 146. In order to secure alignment member 162 to lens retaining member 146, lens retaining member 146 may be molded with first protrusion 148 and second protrusion 152. In other embodiments, first protrusion 148 and second protrusion 152 are secured to lens retaining member 146 subsequent to molding lens retaining member 146. Also, in some embodiments, a single protrusion extends around the circumference of lens retaining member 146. As shown in FIG. 3, first protrusion 148 and second protrusion 152 are generally cylindrical, pin-like members. In other embodiments, lens retaining member 146 includes at least three protrusions. Alignment member 162 may include first cavity 166 and second cavity 168 configured to receive first protrusion 148 and second protrusion 152, respectively. It should be understood that the number of cavities corresponds to the number of protrusions.

Also, to further improve alignment, alignment member 162 may include chamfered region 174 defined as a region of material removed from alignment member 162. Chamfered region 174 may extend around alignment member 162. In this manner, lens module 130 consisting of lens 144 and lens retaining member 146 may be self-aligning or self-centering when positioned over window 142. This reduces assembly time of an electronic device.

Figure 5:
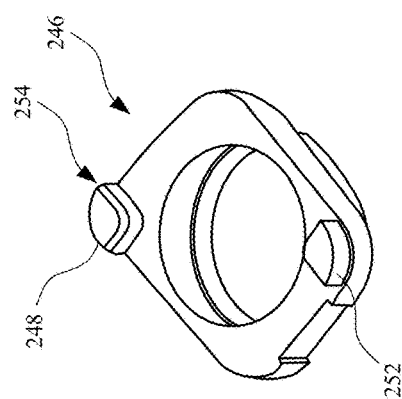
FIG. 5 illustrates an isometric view of the lens retaining module shown in FIG. 4, oriented in a different manner to show various features.

Although lens 144 and lens retaining member 146 may be formed as a unitary structure, in some cases, some light may pass between lens 144 and lens retaining member 146 in an undesired manner. As shown in FIG. 5, most light rays (dotted lines) emitted from first light source 132 and second light source 134 are reflected from lens retaining member 146 such that the light rays pass through lens 144 and window 142. However, one light ray passes between lens 144 and lens retaining member 146. To offset this, device 100 may further include a light blocking member 176 configured to absorb or reflect lights rays. This may prevent the light ray from entering and exiting other locations of device 100. Light blocking member 176 may be positioned circumferentially around an outer perimeter of lens retaining member 146. Also, light blocking member 176 may be molded or adhesively secured to enclosure 102. Also, although not shown, enclosure 102 could be painted on an interior portion of device 100 near window 142. The paint may include colors generally known to absorb light, such as black or gray.

Figure 4:
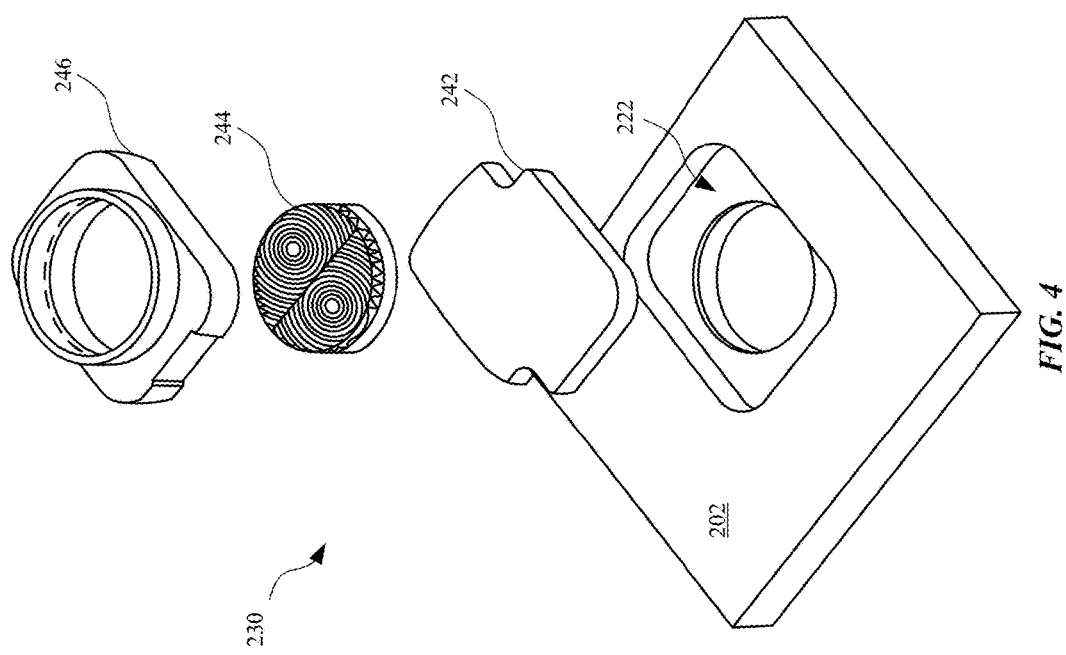
FIG. 4 illustrates an exploded view of components associated with an alternate embodiment of a lens module for use in an electronic device, in accordance with the described embodiments.

FIG. 4 illustrates an exploded view of components associated with an alternate embodiment of a lens module for use in an electronic device, in accordance with the described embodiments. As shown, lens module 230 may include window 242 positioned within an interior region of housing 202 of an electronic device. In some embodiments, window 242 may include a cylindrical portion having a size and shape corresponding to opening 222 of housing 202. Lens 244 and lens retaining member 246, both of which may be formed by a single mold cavity (not shown), may be positioned proximate to window 242. As shown, lens 244 is a Fresnel lens but may include any properties previously described for a lens. Also, lens retaining member 246 may be formed from any materials previously described for a lens.

FIG. 5 illustrates an isometric view of lens retaining member 246 shown in FIG. 4, oriented in a different manner to show various features. For example, lens retaining member 246 may include first protrusion 248 and second protrusion 252 integrally formed with lens retaining member 246. That is, first protrusion 248 and second protrusion 252 are formed simultaneously with lens retaining member 246. First protrusion 248 and second protrusion 252 may combine to define an alignment feature similar to that of alignment member 162 (shown in FIG. 3). In other words, first protrusion 248 and second protrusion 252 may be referred to as alignment members. Window 242 (shown in FIG. 4) may include regions removed from window 242 that generally correspond to the shape of first protrusion 248 and second protrusion 252. In this manner, first protrusion 248 and second protrusion 252 may be positioned with window 242 thereby aligning lens module 230 (which includes lens retaining member 246) with respect to window 242. However, as shown in FIG. 5, first protrusion 248 and second protrusion 252 do not extend around lens retaining member 246. Also, first protrusion 248 and second protrusion 252 may each include chamfered regions designed to enhance alignment of a lens module (e.g., lens module 230). For example, first protrusion 248 includes chamfered region 254 defined as a region of material removed from first protrusion 248.

Figure 6:
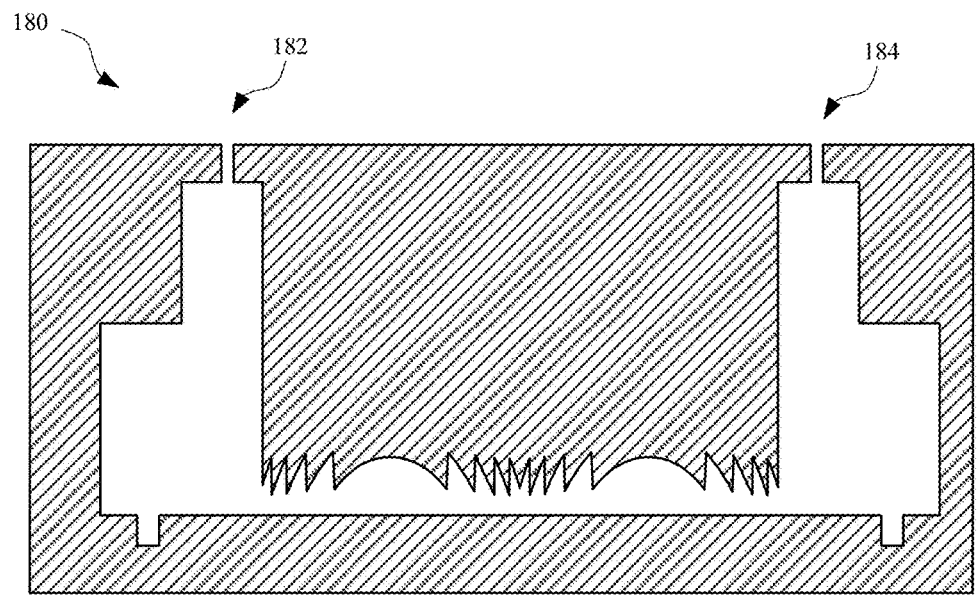
FIG. 6 illustrates a cross sectional view of an embodiment of a mold cavity designed to form a lens module, in accordance with the described embodiments.
Figure 7:
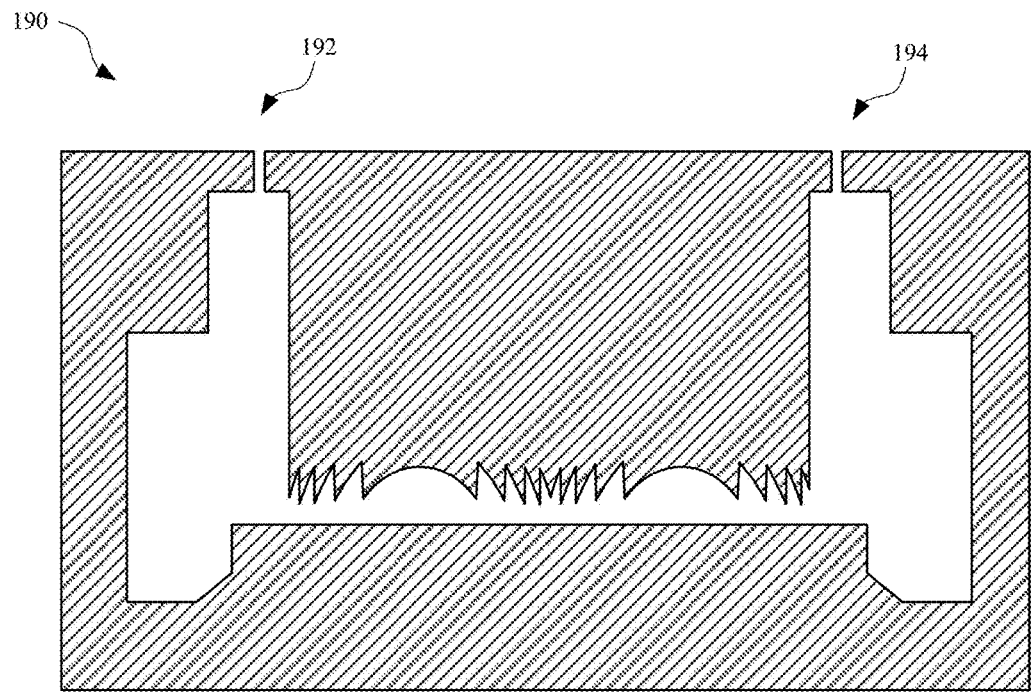
FIG. 7 illustrates a cross sectional view of an alternate embodiment of a mold cavity designed to form an alternate lens module, in accordance with the described embodiments.

FIGS. 6 and 7 illustrate embodiments of mold cavities designed to receive a first material and second material to form the lens module, in accordance with the described embodiments. FIG. 6 illustrates a cross sectional view of an embodiment of mold cavity 180. Mold cavity 180 may have first opening 182 and second opening 184. First opening 182 and/or second opening 184 may be configured to receive clear plastic material in liquid form to form a lens as well as receive an opaque material in liquid form to form a lens retaining member. Accordingly, mold cavity 180 may be used to form lens 144 and lens retaining member 146 shown in FIG. 3 that defines lens module 130. FIG. 7 illustrates a cross sectional view of an alternate embodiment of mold cavity 190. Mold cavity 190 may have first opening 192 and second opening 194. First opening 192 and/or second opening 194 may be configured to receive clear plastic material in liquid form to form a lens as well as receive a subsequent opaque material in liquid form to form a lens retaining member. Accordingly, mold cavity 190 may be used to form lens 244 and lens retaining member 246 shown in FIG. 4 that defines lens module 230. It should be noted that a curing or cooling process may be involved in order to solidify the lens and the lens retaining member. Also, additional features (not shown) in the mold cavities may be present to separate the materials used to form the lens and the lens retaining member.

Figure 8:
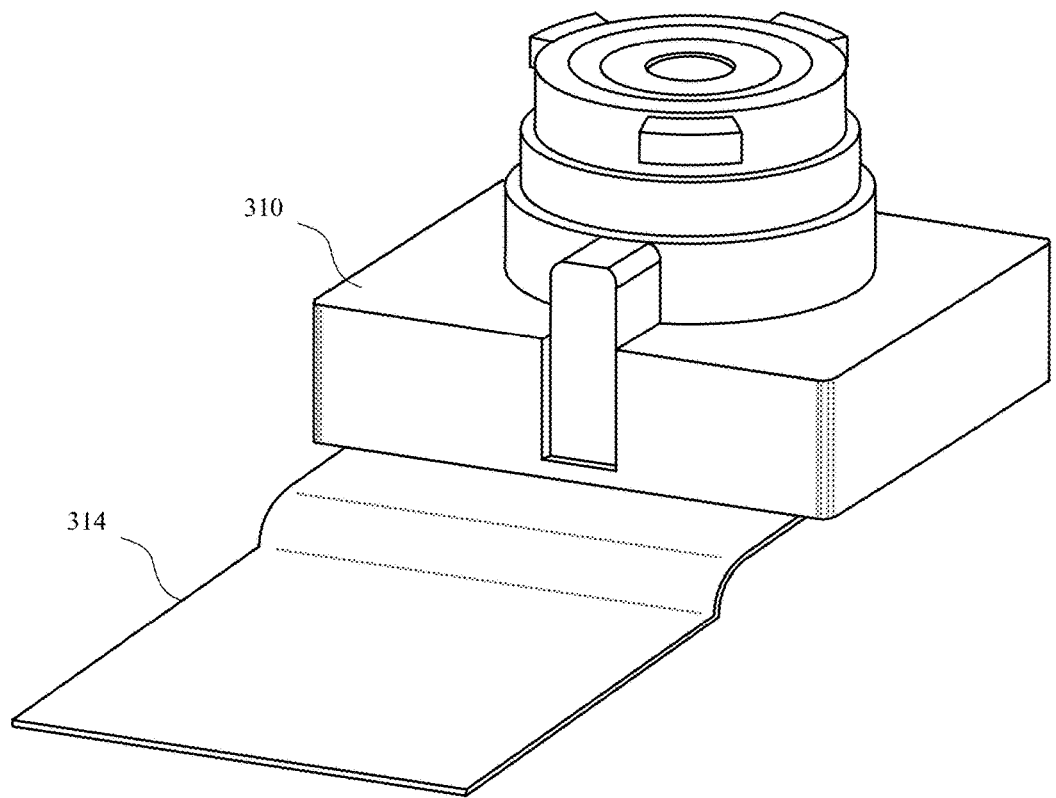
FIG. 8 illustrates an isometric view of an embodiment of a camera module.

FIG. 8 illustrates an isometric view of an embodiment of camera module 310. In some embodiments, camera module 310 is a front facing camera configured to capture images through first opening 110 of substrate 108 (shown in FIG. 1). Camera module 310 may be electrically connected to flexible circuit 314 which may be electrically connected to a main logic board (not shown) within an electronic device. Flexible circuit 314 may include any properties previously described for a flexible circuit (e.g., flexible circuit 156 shown FIG. 3).

Figure 9:
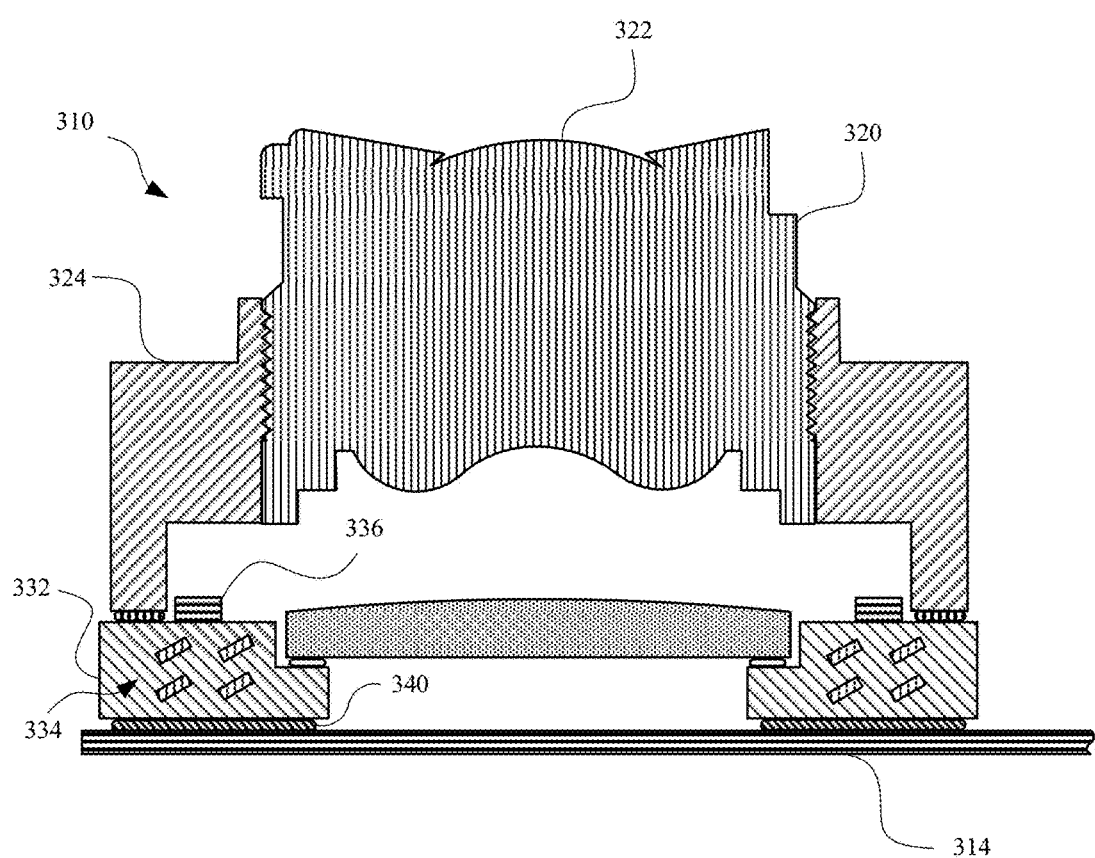
FIG. 9 illustrates a cross sectional view of a camera module and a flexible circuit shown in FIG. 8.

FIG. 9 illustrates a cross sectional view of camera module 310 and flexible circuit 314 shown in FIG. 8. Camera module 310 may include lens fixture 320 having lens 322. Lens fixture 320 may be in threaded engagement with lens holder 324 adhesively secured to substrate 332. In some embodiments, lens fixture 320 and lens holder 324 are both made from a plastic material, or other electrically inert material. Also, in some embodiments, substrate 332 is formed from a ceramic material having metal trace 334 embedded within substrate 332. Metal trace 334 may include a copper material. Metal trace 334 may be configured to form an electrically conductive path between integrated circuit 336 and other components. For example, substrate 332 may be adhesively secured to flexible circuit 314 via adhesive 340, which may be a conductive adhesive that includes an anisotropic conductive film ("ACF"). In this manner, integrated circuit 336 may be electrically connected to, for example, a logic board (not shown) via flexible circuit 314, metal trace 334, and adhesive 340.

In some cases, other internal components (e.g., processor circuit, antenna, electronic sensor) may emit electromagnetic radiation or electromagnetic interference ("EMI"). During use of camera module 310, EMI may cause improper functionality of camera module 310. For example, EMI may interfere with integrated circuit 336 causing camera module 310 to distort an image captured by camera module 310. However, camera module 310 may be shielded from EMI.

Figure 10:
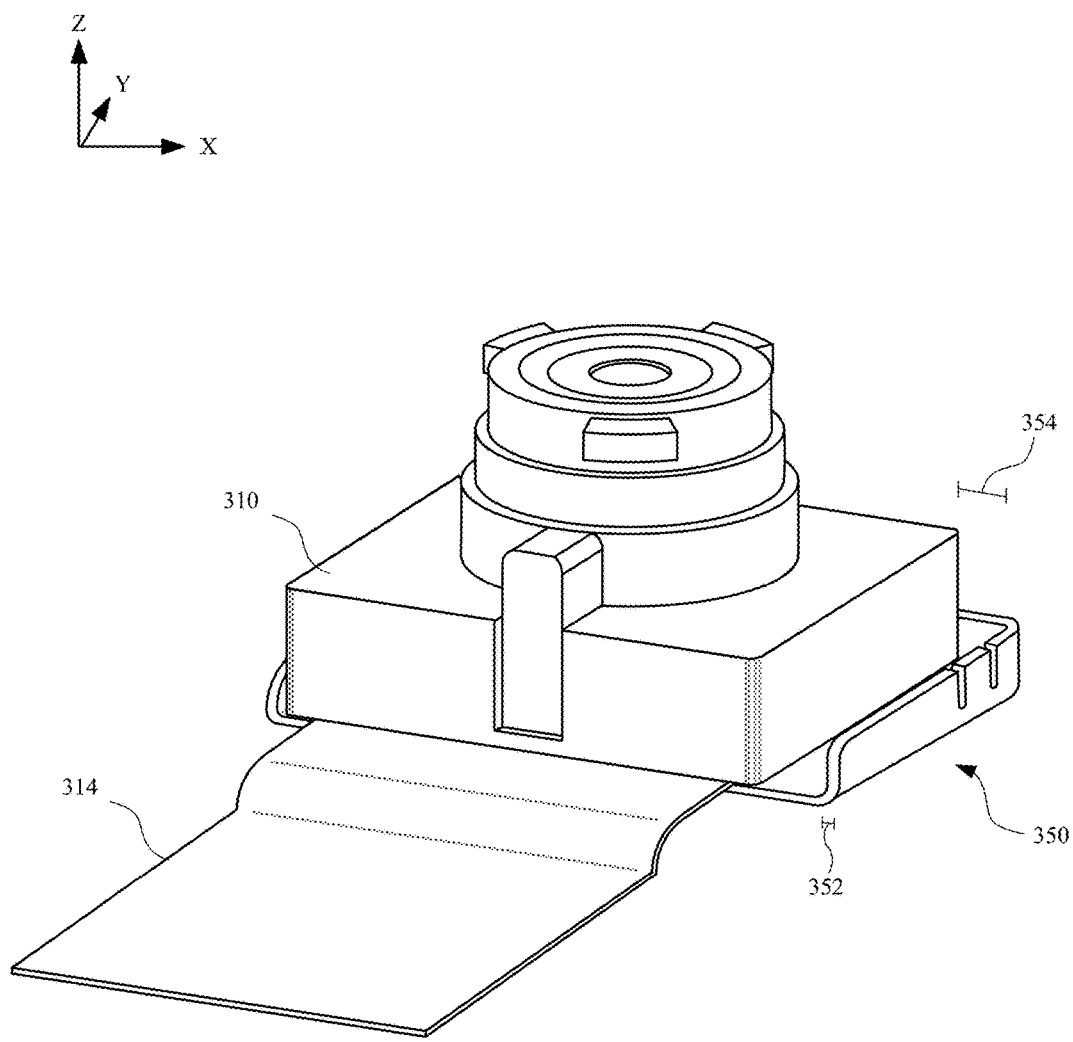
FIG. 10 illustrates an isometric view of a camera module and a flexible circuit positioned within a container.

FIG. 10 illustrates an isometric view of camera module 310 and flexible circuit 314 positioned within container 350. In some embodiments, container 350 is made from metal, such as steel including SS 304 (stainless steel). As shown, container 350 is a unitary structure. Container 350 may include thickness 352 less than 1 millimeter, and in some cases less than 0.5 millimeters. As shown in FIG. 10, container 350 may be a three-sided structure configured to allow flexible circuit 314 to extend beyond container 350. The "three-sided structure" refers to three vertical portions (in a z-direction) positioned around camera module 310, with each vertical portion vertical with respect to a base portion of container 350. Also, container 350 may include a dimension greater than camera module 310 such that camera module 310 may be positioned within container 350 regardless of varying sizes or tolerances of camera module 310. For example, in FIG. 10, container 350 is designed such that clearance 354 exists between camera module 310 and container 350.

In some embodiments, an adhesive or epoxy (not shown) may fill a location of container 350 associated with clearance 354. Further, the adhesive or epoxy may include metallic materials (e.g., silver) such that a substrate (e.g., substrate 332) within camera module 310 is in electrical contact with container 350.

Figure 11:
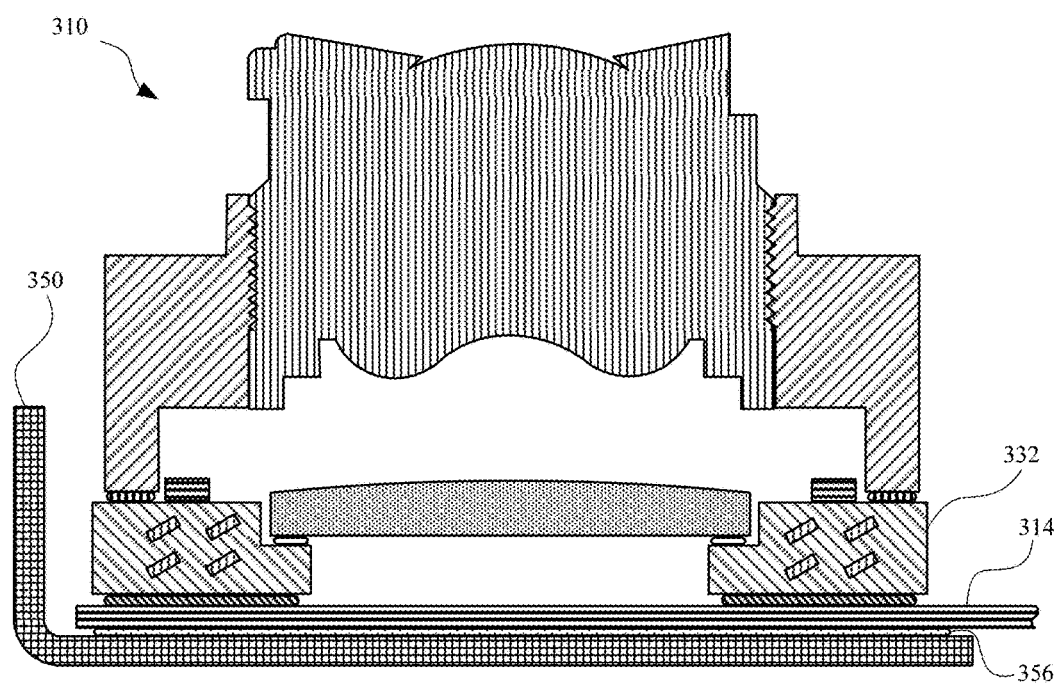
FIG. 11 illustrates a cross sectional view of a camera module and a flexible circuit, with the flexible circuit adhesively secured to a container via an adhesive layer.

FIG. 11 illustrates a cross sectional view of camera module 310 and flexible circuit 314, with flexible circuit 314 adhesively secured to container 350 via adhesive layer 356. In some embodiments, adhesive layer 356 is a conductive adhesive. In this configuration, container 350 may act as an EMI shield for camera module 310. Further, container 350 may stiffen or increase the overall rigidity of substrate 332. As a result, substrate 332 is less susceptible to cracking (including micro cracks) during a load-bearing event, such as a drop event of an electronic device having substrate 332.

Figure 12:
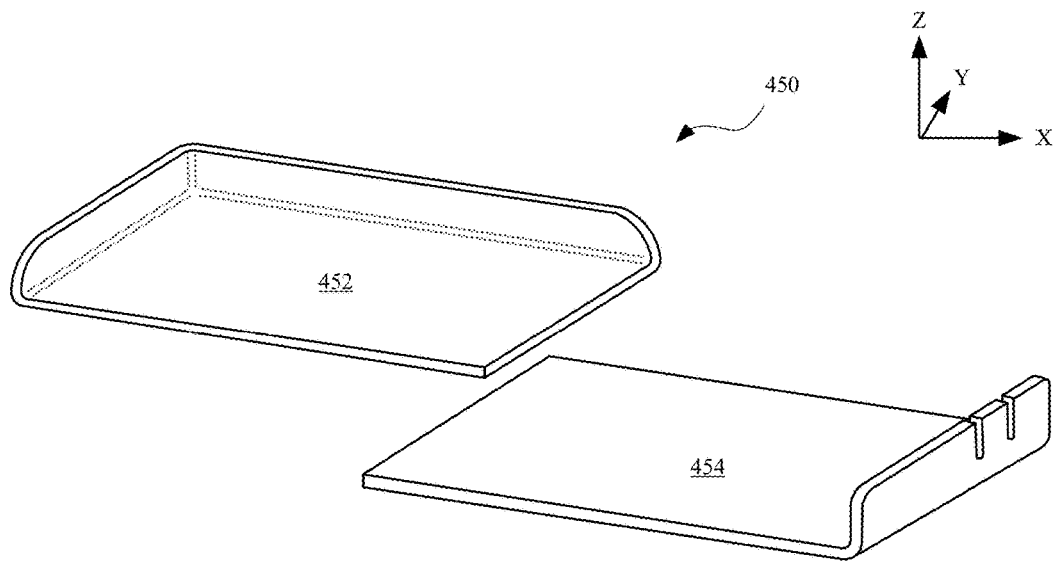
FIG. 12 illustrates an isometric view of an embodiment of a container having a first containment member and a second containment member.

The container may include alternative designs allowing the electronic device to forego the adhesive or epoxy used to in the location of container 350 associated with clearance 354 (discussed in FIG. 10). For example, FIG. 12 illustrates an isometric view of an embodiment of container 450 having first containment member 452 and second containment member 454. As shown, first containment member 452 includes two vertical portions and second containment member 454 includes a single vertical portion. When combined, first containment member 452 and second containment member 454 define a three-sided structure, that is, a structure having three vertical portions (e.g., three portions extending in a z-direction). As shown, at least one region of container 450 does not include a vertical portion. This region allows a flexible circuit (e.g., flexible circuit 314) to extend beyond container 450. Also, second containment member 454 may be secured above or below first containment member 452. In either case, the two members may be adhesively secured to each other. Also, first containment member 452 and second containment member 454 are designed to be in a sliding engagement with one another. In this manner, the vertical portions of container 450 may be positioned closer to a camera module. Also, container 450 may be made of any material previously described for a container (e.g., container 350 shown in FIG. 10).

Figure 13:
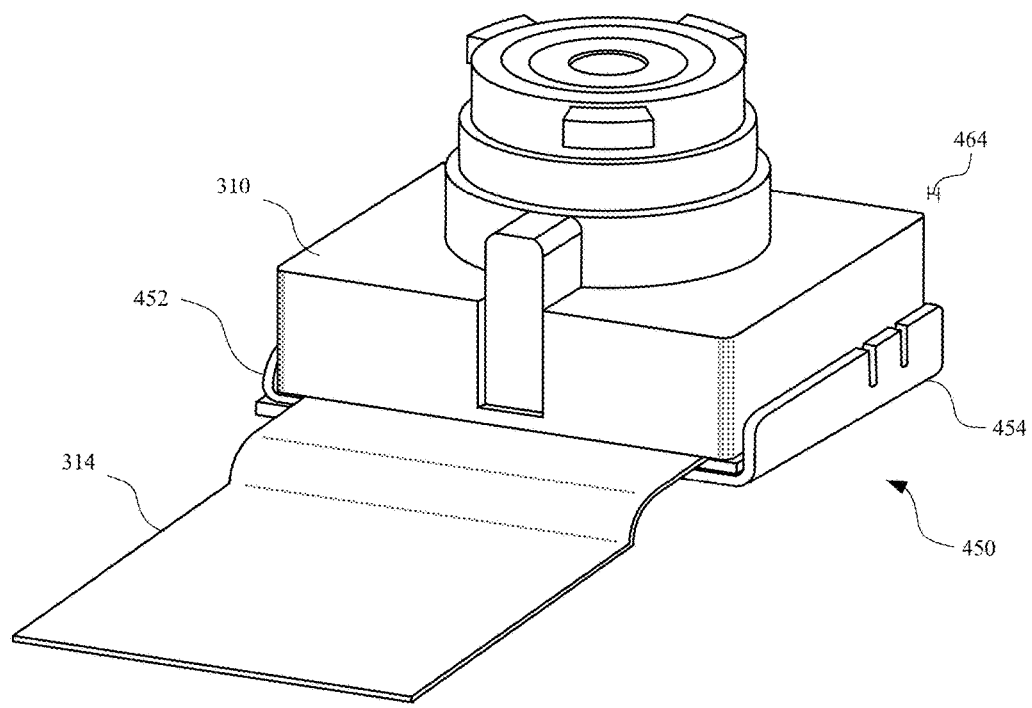
FIG. 13 illustrates an isometric view of a camera module and a flexible circuit positioned within a container, the container defined by the first member adhesively secured to the second member.

FIG. 13 illustrates an isometric view of camera module 310 and flexible circuit 314 positioned within container 450, with container 450 defined by first containment member 452 secured to second containment member 454. Due in part to the dynamic nature of container 450 (that is, the multiple structures), container 450 may be positioned closer to camera module 310, and in particular, the vertical portions of container 450 may be positioned closer to camera module 310. For example, when camera module 310 is positioned within container 450, a location associated with clearance 464 is less than a location associated with clearance 354 (previously shown in FIG. 10). In this manner, first containment member 452 and second containment member 454 combine to define an EMI shield that does not require an adhesive or epoxy in a location associated with clearance 464. Accordingly, materials used and manufacturing times may be reduced. Also, first containment member 452 and second containment member 454 may include a thickness (similar to thickness 352 shown in FIG. 10) that is less than 1 millimeter, and in some cases less than 0.5 millimeters.

Figure 14:
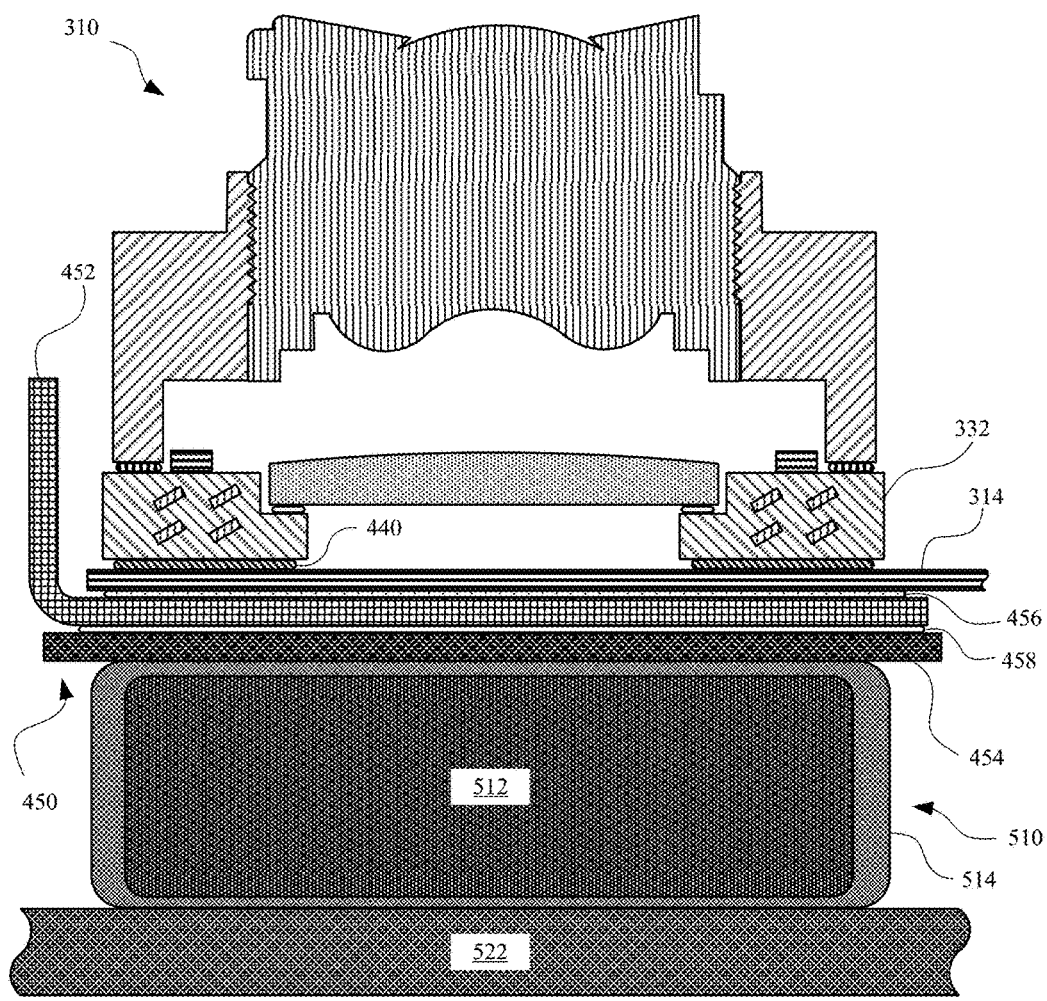
FIG. 14 illustrates a cross sectional view of a camera module and a flexible circuit adhesively secured to a container, with additional features designed to provide an electrically conductive path for the camera module.

FIG. 14 illustrates a cross sectional view of camera module 310 and flexible circuit 314 adhesively secured to container 450. In particular, flexible circuit 314 is adhesively secured to first containment member 452 via first adhesive layer 456. Also, first containment member 452 is adhesively secured to second containment member 454 via second adhesive layer 458. First adhesive layer 456 and second adhesive layer 458 may be formed from one or more materials such that first adhesive layer 456 and second adhesive layer 458 are conductive adhesives. Further, substrate 332 may be adhesively secured to flexible circuit 314 using conductive adhesive 440. In this manner, substrate 332 may be electrically connected to container 450.

In some embodiments, container 450 is positioned on, and in some cases, adhesively secured to, conductive member 510 configured to provide an electrically conductive path for camera module 310. In the latter case, the adhesive is a conductive adhesive. Conductive member 510 may include a first layer 512 made from materials such as boron. In some embodiments, first layer 512 includes an open-cell configuration. Conductive member 510 may further include second layer 514 extending around first layer 512. Second layer 514 may be formed from an electrically conductive fabric. In some embodiments, second layer 514 is formed from copper. In other embodiments, second layer 514 is formed form silver. Still, in other embodiments, second layer 514 is formed from a combination of silver and copper. Conductive member 510 may be in contact with an electrically conductive member 522 within an electrical device. As shown, electrically conductive member 522 is engaged to a region of second layer 514 opposite a region in which second containment member 454 is engaged, and electrically connected, to second layer 514. In some embodiments, electrically conductive member 522 is a metal cowling that secures another camera (e.g., second camera module 120, shown in FIG. 2) positioned within another location of the electronic device. When electrically conductive member 522 is secured to an electrical ground such as an enclosure of an electronic device (e.g., enclosure 102, shown in FIG. 1), conductive member 510 provides part of an electrical grounding path for camera module 310. Also, the configuration shown in FIG. 14 may be used in conjunction with an electronic sensor (not shown) located near camera module 310 and its components.

Figure 15:
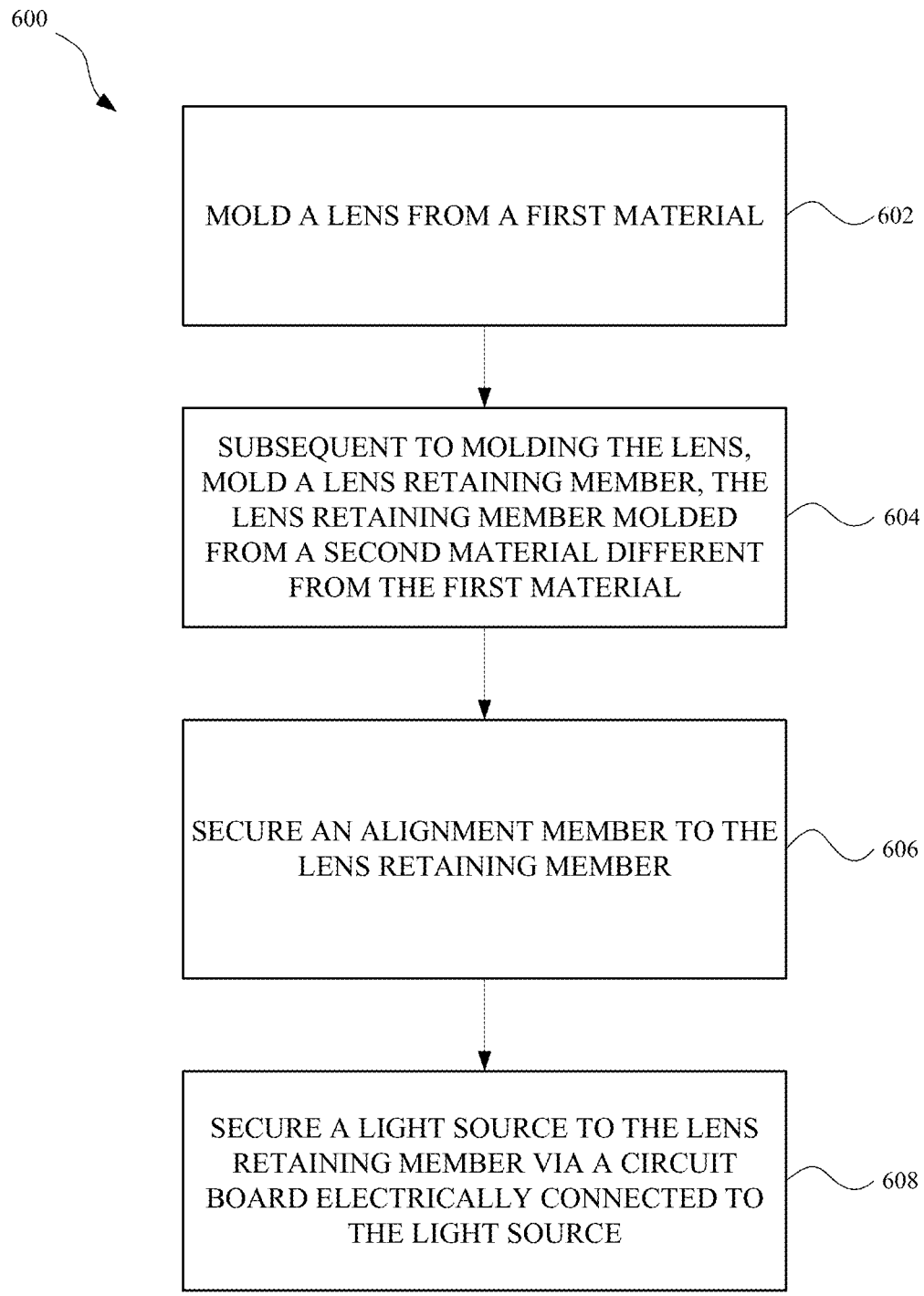
FIG. 15 illustrates a flowchart showing a method for assembling an electronic device.

FIG. 15 illustrates a flowchart 600 showing a method for assembling an electronic device. In step 602, a lens is molded from a first material. The first material may be a clear, plastic polycarbonate material. Also, in some embodiments, the lens is a Fresnel lens configured to direct light from a light source to a window within the electronic device.

In step 604, subsequent to molding the lens, a lens retaining member is molded. The lens retaining member can be molded from a second material different from the first material. Also, the material used to form the second material is generally opaque. Also, a mold cavity used to form the lens can also be used to form the lens retaining member. The mold cavity may be part of a dual shot process in which two molding process formed from two different materials are performed in one process. This may reduce the manufacturing time of the electronic device.

In step 606, an alignment member is secured to the lens retaining member. In order to secure the components, the lens retaining member may include one or more protrusions that engage a corresponding number of cavities within the alignment member. Alternatively, or in conjunction, the alignment member may be adhesively secured to the lens retaining member. The alignment member may also include a chamfered region. During an assembly process, the chamfered region further allows the lens retaining member to self-align with the window. Also, the alignment member may be designed such that the alignment member is not in contact with an enclosure of the electronic device.

In step 608, a light source is secured to the lens retaining member via a circuit electrically connected to the light source. In this manner, the light source emits light toward the lens. The lens retaining member is configured to absorb or reflect the light such that the light does not enter other locations of the electronic device.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device having an enclosure that carries a light source, the electronic device comprising:
    a window formed from a piece of transparent material, wherein the window extends into an opening in the enclosure;
    a single-piece lens module carried by the enclosure, the single-piece lens module comprising:
        a lens formed from a first material and positioned proximate to the window; and
        a lens retaining member surrounding the lens, the lens retaining member formed from a second material different from the first material, wherein at least a portion of the window is interposed between the lens retaining member and the enclosure; and
    an alignment member secured with the enclosure and surrounding the lens retaining member to align the lens retaining member with respect to the window.

2. The electronic device of claim 1, wherein the light source is at least partially positioned within the lens retaining member.

3. The electronic device of claim 2, further comprising:
    a camera module; and
    a second light source at least partially positioned with the lens retaining member, wherein the light source and the second light source combine to define a flash for the camera module.

4. The electronic device of claim 1, further comprising a light blocking member positioned around the lens retaining member and the alignment member, the light blocking member secured to the enclosure.

5. The electronic device of claim 1, wherein the first material comprises a transparent material, and wherein the second material comprises an opaque material that absorbs or reflects light from the light source.

6. The electronic device of claim 1, wherein the alignment member is free of contact with the enclosure.

7. The electronic device of claim 1, wherein the lens comprises a Fresnel lens.

8. The electronic device of claim 1, wherein:
    the lens retaining member further comprises a first protrusion and a second protrusion; and
    the alignment member surrounds an outer circumference of the lens retaining member and an outer circumference of the lens, the alignment member comprises a first cavity to receive the first protrusion and a second cavity to receive the second protrusion.

9. The electronic device of claim 1, wherein the lens retaining member comprises a protrusion, and wherein the alignment member comprises a cavity that receives the protrusion to couple the lens retaining member with the alignment member.

10. The electronic device of claim 1, wherein the enclosure comprises a cavity that receives the window.

11. The electronic device of claim 1, wherein the lens retaining member reflects light from the light source, and wherein the lens refracts the light from the lights source off the lens retaining member to the window.

12. The electronic device of claim 1, wherein the lens comprises an outer diameter, and wherein the lens retaining member comprises an inner diameter in accordance with the outer diameter.

13. The electronic device of claim 1, wherein the first material comprises a first mold material, and wherein the second material a second mold material that combines with the first mold material, causing the lens to be seamlessly connected with the lens retaining member.

14. An electronic device comprising:
    a housing having an opening;
    a light source mounted within the housing, wherein the light source emits light through the opening;
    a window that is mounted in the housing and that extends into the opening;
    a single-piece lens module mounted in the housing, the single-piece lens module comprising:
        a lens aligned with the window; and
        a lens retaining member surrounding the lens; and
    an alignment member secured within the housing and surrounding the lens retaining member to align the lens retaining member with the window, wherein the alignment member is interposed between the lens retaining member and the housing.

15. The electronic device defined in claim 14 wherein the alignment member comprises a chamfered edge portion.

16. The electronic device defined in claim 14 wherein the lens retaining member comprises a plurality of pins that extend into the alignment member to attach the lens retaining member to the alignment member.

17. The electronic device in claim 14 further comprising a light blocking member mounted in the housing, wherein the light blocking member surrounds the alignment member and the lens retaining member and absorbs at least some of the light emitted by the light source that does not exit the housing through the window.

18. An electronic device comprising:
    a housing having an opening;
    a circuit board mounted within the housing;
    a light source mounted on the circuit board, wherein the light source emits light through the opening;
    a window formed from transparent material mounted within the housing, wherein the window extends into the opening;
    a single-piece lens module mounted in the housing, the single-piece lens module comprising:
        a lens aligned with the window;
        a lens retaining member surrounding the lens, wherein the lens retaining member is mounted to the circuit board, and wherein the window is at least partially interposed between the lens retaining member and the housing;
    a light blocking member that is secured to the housing and surrounds an outer perimeter of the lens retaining member; and
    an alignment member surrounding the lens retaining member to align the lens retaining member with the window.

19. The electronic device defined in claim 18 wherein the alignment member surrounds the window.

20. The electronic device defined in claim 18 wherein the lens retaining member is positioned to redirect the light from the light source toward the lens.

* * * * *